(12) United States Patent
Fassmer (10) Patent No.: US 10,091,685 B2
(45) Date of Patent: Oct. 2, 2018

(54) METHOD OF ADAPTING A NETWORK READINESS FOR DOWNLOADING VIDEO DATA

(71) Applicant: Jens Fassmer, Meerbusch (DE)

(72) Inventor: Jens Fassmer, Meerbusch (DE)

(73) Assignee: Vodafone Holding GmbH (DE)

( * ) Notice: Subject to any disclaimer, the term of this patent is extended or adjusted under 35 U.S.C. 154(b) by 258 days.

(21) Appl. No.: 14/958,387

(22) Filed: Dec. 3, 2015

(65) Prior Publication Data

US 2016/0286428 A1 Sep. 29, 2016

(30) Foreign Application Priority Data

Dec. 19, 2014 (DE) .................................. 14199106

(51) Int. Cl.
*G06F 15/16* (2006.01)
*H04W 28/02* (2009.01)
(Continued)

(52) U.S. Cl.
CPC ......... *H04W 28/0273* (2013.01); *H04L 47/25* (2013.01); *H04L 47/38* (2013.01);
(Continued)

(58) Field of Classification Search
CPC ..... H04L 65/602; H04L 65/608; H04L 43/00; H04L 67/06; H04L 67/2823;
(Continued)

(56) References Cited

U.S. PATENT DOCUMENTS 5,568,181 A * 10/1996 Greenwood ....... H04N 7/17336
348/E7.073
8,396,983 B1 * 3/2013 Inskip ............... H04L 29/06517
709/203
(Continued)

OTHER PUBLICATIONS

Nasser, Nidal, Ahmed Hasswa, and Hossam Hassanein. "Handoffs in fourth generation heterogeneous networks." IEEE Communications Magazine 44.10 (2006): 96-103.
(Continued)

*Primary Examiner* — Glenton B Burgess
*Assistant Examiner* — Tan Doan
(74) *Attorney, Agent, or Firm* — Tarolli, Sundheim, Covell & Tummino LLP (57) ABSTRACT

The invention describes a method of adapting a network readiness (850) for downloading video data comprising the steps of:
  determining a download quality for downloading video data;
  determining whether the download quality is above or below a defined quality threshold value (890);
  adapting a network capacity and/or a video quality depending on the result of the determination of the download quality such that the download quality is above the defined quality threshold value (890).

The invention further relates to a corresponding first network system, second network system and a communication system. It's a basic idea of the present invention to provide a method and corresponding devices or systems which enable a control of the network readiness (850) of a communication network with respect to the download of video data in order guaranty a defined download quality.

13 Claims, 8 Drawing Sheets

(51) Int. Cl.
*H04L 29/08* (2006.01)
*H04N 21/24* (2011.01)
*H04N 21/262* (2011.01)
*H04N 21/61* (2011.01)
*H04N 21/6338* (2011.01)
*H04W 28/08* (2009.01)
*H04L 12/811* (2013.01)
*H04L 12/825* (2013.01)
*H04W 84/12* (2009.01)
*H04L 12/851* (2013.01)

(52) U.S. Cl.
CPC .......... *H04L 67/06* (2013.01); *H04L 67/2823* (2013.01); *H04L 67/2842* (2013.01); *H04L 67/2857* (2013.01); *H04L 67/322* (2013.01); *H04N 21/2402* (2013.01); *H04N 21/26208* (2013.01); *H04N 21/6131* (2013.01); *H04N 21/6338* (2013.01); *H04W 28/08* (2013.01); *H04L 47/24* (2013.01); *H04W 28/0268* (2013.01); *H04W 84/12* (2013.01)

(58) Field of Classification Search
CPC ............. H04L 67/2842; H04L 67/2857; H04L 67/322; H04L 47/24; H04W 28/0273; H04W 28/0268; H04W 28/08; H04W 84/12; H04N 21/2402; H04N 21/26208; H04N 21/6338
USPC .................................................. 709/231, 227
See application file for complete search history.

(56) References Cited

U.S. PATENT DOCUMENTS

| | | | |
|---|---|---|---|
| 8,745,206 B1 | 6/2014 | Chang et al. | |
| 9,521,178 B1* | 12/2016 | Gigliotti | H04L 65/602 |
| 2005/0249226 A1* | 11/2005 | Kang | H04N 21/23406 |
| | | | 370/412 |
| 2013/0117415 A1 | 5/2013 | Gilson | |
| 2013/0159498 A1* | 6/2013 | Funge | H04L 65/80 |
| | | | 709/224 |
| 2013/0179589 A1* | 7/2013 | McCarthy | H04N 21/8456 |
| | | | 709/231 |
| 2013/0286837 A1* | 10/2013 | Khanchi | H04L 47/127 |
| | | | 370/235 |
| 2014/0164454 A1* | 6/2014 | Zhirkov | H03M 7/55 |
| | | | 707/829 |
| 2014/0241419 A1 | 8/2014 | Holmer | |
| 2014/0317308 A1* | 10/2014 | Zhang | H04L 65/4069 |
| | | | 709/231 |
| 2016/0154923 A1* | 6/2016 | Malhotra | G06F 17/5081 |
| | | | 716/115 |

OTHER PUBLICATIONS

Yan, Xiaohuan, Y. Ahmet Şekercioğlu, and Sathya Narayanan. "A survey of vertical handover decision algorithms in Fourth Generation heterogeneous wireless networks." Computer networks 54.11 (2010): 1848-1863.

* cited by examiner

METHOD OF ADAPTING A NETWORK READINESS FOR DOWNLOADING VIDEO DATA

FIELD OF THE INVENTION

The invention relates to a method of adapting a network readiness for downloading video data. The invention further relates to a corresponding first network system and second network system. The invention finally relates to a communication system comprising the first network system and/or the second network system.

BACKGROUND OF THE INVENTION

Stalling of videos played by mobile communication devices is an essential problem in communication networks and especially mobile communication networks. The increasing capabilities of communication devices and especially mobile communication devices as, for example, smartphones, tablets and mobile computers and the corresponding offer of high resolution videos require an improvement or flexible adaption of the network infrastructure. Furthermore, local and/or temporal changes of the download characteristics of video data may have a major impact regarding download quality.

SUMMARY OF THE INVENTION

It's thus an object of the present invention to provide an improved method of adapting a network readiness for downloading video data. The method may be especially useful in mobile communication networks.

According to a first aspect a method of adapting a network readiness for downloading video data is provided. The method comprises the steps of:

determining a download quality for downloading video data;

determining whether the download quality is above or below a defined quality threshold value;

adapting a network capacity and/or a video quality depending on the result of the determination of the download quality such that the download quality is above the defined quality threshold value.

Network readiness for downloading video data means the capability of a communication network to provide a predefined quality of service with respect to downloading video data. The quality of service may, for example, be the likelihood that a video of a given video resolution can be transmitted, received and played by means of a communication device without visual disturbance of the user of the communication device viewing the video. A well known visual disturbance is, for example, stalling of videos. The transmission or reception of the video data stops such that the user sees a frozen picture or even only parts of a picture for a visual time period.

The network readiness is especially relevant for mobile communication networks in which the available bandwidth for transferring video data is relatively small in comparison to communication networks which are only based on wired connections. Wireless communication networks may be mobile communication networks as GSM, UMTS and LTE or the like which are usually termed as Wireless Wide Area Networks but also Wireless Local Area Networks which may be based on the IEEE-802.11 standard or comparable standards.

The network readiness on a global and on a local level may depend on the number of users accessing the communication network within a given time period and the amount of data which is on average downloaded by the users within the time period. The amount of downloaded data may depend on the communication device of the user and the offered data. The signal strength and the device and network capabilities are other important factors influencing the download rate and, hence, the network readiness. The network download rate is influenced by the end-to-end chain from the mobile device all up to the video content server/provider. The most limiting part in that chain is however the mobile network and the mobile device with their respective download rate capabilities, i.e. GSM/EDGE/UMTS/HSDPA/HSPA+/LTE capable network and/or device.

Modern communication devices as smartphones and tablets are able to present high definition videos with a resolution of 720p (1280×720) and 1080p (1920×1080). The offered video data is adapted to this capability of the communication device such that the number of high definition videos which can be downloaded increases. In addition the available time resolution (number of pictures or halve pictures per time period) may be increased in view of the growing computation power of the communication devices. The overall video data traffic will therefore grow on a global level and in addition there may be events as concerts, public festivals or sport events which may cause local and temporal increase of video data traffic.

The method according to the present invention enables the adaption of the network readiness by determining a download quality for downloading video data. The download quality may be, for example, the percentage of video downloads without stalling. The download quality may be determined by means of measuring or estimating the number of downloads of video data and the related video data per time period. The video data may be clustered in subset of videos wherein the subset may be characterized by the resolution (e.g. 360p, 480p, 720p etc.). A network provider may, for example, measure the number of people accessing videos with a defined resolution (e.g. 360p, 480p, 720p etc.) within a defined time period. An indirect measure of the download quality may be the number of terminations of video downloads initiated by the users of communication devices. The behavior of the users downloading video data may alternatively or in addition be predictable e.g. within the course of a day or week or with respect to certain events (e.g. football game) such that download quality can be estimated based on past data and optionally taking into account the expected composition of the users visiting the event and the development of the available communication devices and the offered video data.

A network capacity is sufficient as long as the download quality is above a predefined quality threshold value. The quality threshold may be, for example, that at least 95% of videos with a defined resolution are downloaded without stalling. It may also be possible to define a quality threshold value which is related to all videos comprising videos with different video resolutions by taking into account a distribution of videos with the different resolutions which are downloaded, for example, within certain time periods. The network capacity is, for example, increased if the download quality is below the quality threshold value.

The network capacity may be increased by increasing the number of base stations serving a defined area at a given time period. The number of base stations may be increased by switching on available base stations or controlling the power or, for example, an elevation angle of antennas of running base stations in order to increase or change the area served by the base stations. It may thus be possible to increase the network capacity on a global level but also on a local level by using, for example, available capacities of base stations in the neighborhood of an area in which the download quality is below the defined quality threshold value. The adaption may also result in a reduction of network capacity if the download quality is much higher than the defined quality threshold value. It may be possible in this respect to reduce the network capacity in certain areas in order to increase the network capacity in one or more neighboring areas such that the download quality in all areas is above the defined quality threshold value.

The method may also be used as a planning tool in order to adapt the network capacity on a longer time scale in accordance with the development of the communication devices with respect to the ability to present videos with high video resolution and the available video data. It may be possible to provide, for example, a simulation tool which enables an estimation of needed infrastructure within a country, towns or part of towns in comparison to the available infrastructure and the related costs.

Alternatively or in addition to the adaption of the network capacity it may be advantageous to adapt the video quality of downloaded video. The video quality may be decreased by decreasing the resolution of the videos and/or reducing the number of pictures of halve pictures submitted per time period (time resolution) if the download quality is below the defined quality threshold value. The adaption of the video quality may be done by the network provider or by means of the video data provider. The network provider may, for example, submit a reduced number of pictures per time period. The video data provider may offer the same video with different video resolution and the request of the user may be adapted by the network provider, for example, by means of an information added to the request such that a video with lower resolution is downloaded. The video data provider may alternatively actively change the video resolution of downloaded videos after receiving corresponding information from the network provider. The video data provider may further provide videos with adaptable resolution such that the network provider can decrease or increase the video resolution depending on the determined download quality.

The step of determining the download quality for downloading video data may comprise the steps of:
  determining a network download characteristic for video data;
  determining a video bitrate threshold.

The step of determining whether the download quality is above or below a defined quality threshold value may comprise the step of:
  determining a probability whether the download quality is above or below the defined quality threshold value by comparing the network download characteristic and the video bitrate threshold for a download of a subset of video data.

The average network download rate may be 1 Megabit per second (1 Mbps), 2 Mbps, 3 Mbps or more. The average network download rate and the network download rate distribution function are independent of the video bitrate and the resolution. So, the average network download rate can be calculated across the whole population of videos irrespective of which resolution or video bitrate they have.

However, the average network download rate and the network download rate distribution function should be calculated per network bearer, i.e. GSM, EDGE, UMTS, HSDPA, HSPA+ and LTE. LTE, for example, would mean that both the network and the mobile device have to support LTE. If the network supports HSPA+ but the mobile device only supports UMTS, then this video should be counted in the UMTS distribution function. The resulting overall network download rate probability density distribution function is the weighted sum of all these probability density distribution functions (PDF). For example, if the number of video sessions is as follows:
GSM: A sessions/PDF_GSM
EDGE: B sessions/PDF_EDGE
UMTS: C sessions/PDF_UMTS
HSDPA: D sessions/PDF_HSDPA
HSPA+: E sessions/PDF_HSPA+
LTE: F sessions/PDF_LTE Then the overall probability density function (PDF_all) is:
PDF_all=A/(A+B+C+D+E+F)*PDF_GSM+
B/(A+B+C+D+E+F)*PDF_EDGE+
C/(A+B+C+D+E+F)*PDF_UMTS +
D/(A+B+C+D+E+F)*PDF_HSDPA+
E/(A+B+C+D+E+F)*PDF_HSPA++
F/(A+B+C+D+E+F)*PDF_LTE+

The average video bitrate and the video bitrate distribution function instead are specific and different for each resolution. It has to be calculated for each resolution. The video bitrate threshold may be determined by the video resolution e.g. 360p, 480p, 720p. The video bitrate is influenced by the Video Frame Rate, Video Resolution, Movement (slow/fast movement, random/predictable movement), Complexity of the pictures Video Codec, Video Container, Quality of video encoder, Audio quality. The video bitrate may be constant or adaptable. The video bitrate threshold may, for example, be calculated based on a video resolution threshold of 720p. The network download characteristic may be determined by means of measuring or estimating the number of downloads of video data and the related video data per time period. The network download characteristic may comprise a an average network download rate and a respective standard deviation. Based on the network download characteristic and the video bitrate threshold the probability is determined for a subset of video downloads with in this example a resolution of 720p whether the download quality is above or below the defined quality threshold value by comparing the network download characteristic and the video bitrate threshold. The defined quality threshold value is defined in this case as probability of 85%, 90%, 95% or more. The network capacity and/or the video quality are, for example, adapted if the probability for a single video download is below the requested probability of 85%, 90%, 95% or more.

The step of determining the probability whether the download quality is above or below the defined quality threshold value for the download of the subset of video data comprises the steps of:
  assigning a first probability distribution function to the network download characteristic;
  assigning a second probability distribution function to the video bitrate threshold;
  multiplying the first probability distribution function with the a second probability distribution function resulting in a two-dimensional probability distribution function;
  determining a volume under a surface of the two-dimensional probability distribution function for all network download bitrates which are higher than corresponding video bitrates.

The network download characteristic may comprise the average network download bitrate and the corresponding standard deviation determined with respect to the first probability distribution function. The first probability distribution function may be a probability density function showing the frequency of a network download bitrate at a given network download bitrate bucket (e.g. between 1500 kbps and 1600 kbps). The probability density function may be modelled by means of measurement data showing the frequency of downloads of videos at the different network download bitrates at a given average network download bitrate. The probability density function is calculated by dividing the frequency or number of sessions at a given average network download bitrate by the overall number of sessions The video bitrate threshold is taken as the average video bitrate and the corresponding standard deviation determined with respect to the second probability distribution function. The second probability distribution function may be a probability density function showing the frequency of a video bitrate for a given subset of videos (e.g. for 360p, 480p, 720p). The distribution of the frequency of video bitrates is determined by the Video Frame Rate, Video Resolution, Movement (slow/fast movement, random/predictable movement), Complexity of the pictures Video Codec, Video Container, Quality of video encoder, Audio quality. The probability density function may be modelled by means of measurement data showing the frequency of a video bitrate at the different video bitrates.

The product of the first and the second probability distribution function results in a two-dimensional probability distribution function. The two-dimensional probability distribution function may be a two-dimensional probability density function. The integration of the two-dimensional probability distribution function with respect to the network download bitrate and the video bitrate under the boundary condition that the network download bitrate is bigger than the video bitrate can be used to calculate the probability that the network download bitrate is higher than the video bitrate. The volume under the surface of the two-dimensional probability distribution function for which the network download bitrate is bigger than the video bitrate determines the network readiness for video. Each resolution (e.g. 360p, 480p, 720p) has a different video bitrate probability distribution function. Each of these has to be multiplied with the overall network download rate probability distribution function resulting in a two-dimensional probability distribution function. For each of these the volume under the surface of the two-dimensional probability distribution function for which the network download bitrate is bigger than the video bitrate determines the network readiness for video for each resolution.

The first probability distribution function and the second probability distribution function may be modelled as gamma distribution functions. Measurements have shown that the probability distributions with respect to the video bitrate and the network download bitrate can be well modelled by means of Gamma Distribution Functions. The parameters of the Gamma Distribution Functions can be adapted to the, for example, measured network download characteristic and the video bitrate threshold which is characterized by the average video bitrates for each resolution and their respective standard deviations.

This enables an easy calculation of the probability whether the download quality is above or below the defined quality threshold value and, hence, the network readiness for video. This probability can be compared with a probability value which is used as defined quality threshold value. The network is ready for transmission and reception of video with a resolution in accordance with the video bitrate threshold if the calculated probability is higher than the defined quality threshold value.

The distribution functions may be determined in an open or closed loop control system by means of samples taken from past or current video downloads. Taking a few samples of current downloads and modelling the respective first and second probability distribution functions may enable a real-time or close to real-time closed loop control method and a corresponding control system by adapting the network capacity and/or the video quality and immediately checking the effect with respect to the network readiness.

The step of determining the download quality for downloading video data may further comprise the steps of:

determining a local time period and a corresponding location area;

determining an expected video bitrate threshold at the local time period and the corresponding location area;

determining a probability whether an available network download bitrate is higher than the expected video bitrate threshold for the download of the subset video data.

The step of determining whether the download quality is above or below the defined quality threshold value may comprise the step of:

comparing the probability whether the available network download bitrate is higher than the expected video bitrate threshold for the download of the subset of video data with the quality threshold value.

The network readiness may vary with time and location. Locally and timely limited events as concerts, public festivals or sport events may cause local and temporal increase of data traffic related to video downloads. The expected video bitrate threshold may be a reference value which is generated based on simulations taking into account probability of video downloads at a defined event, expected number of people and distribution of used mobile devices, and average video resolution which may depend on the event. Alternatively or in addition, measurement results of previous similar events may be used in order to determine the expected video bitrate threshold. The available network download bitrate may, for example, be a network download rate which enables acceptable download quality without the event. The probability whether an available network download bitrate is higher than the expected video bitrate threshold for a single download of video data may, for example, be determined by means of probability distribution function which may be modeled based on measurement data as described above. Furthermore, the signal strength and the device and network capabilities are other important factors influencing the download rate and, hence, the network readiness which can be determined by means of measurements and/or simulations.

The step of adapting a network capacity and/or a video quality depending on the result of the determination of the download quality may comprise the step of:

adapting the number and/or capacity of base stations serving the location area at the local time period.

The network capacity may be increased by increasing the number of base stations serving a defined area at a given time period. The number of base stations may be increased by switching on available base stations or controlling the power or, for example, an elevation angle of antennas of running base stations in order to increase or change the area served by the base stations. Furthermore, sectors of a base station may be switched on or off in order to adapt the network capacity and correspondingly the network readiness regarding the download of videos in certain areas at certain times.

The step of adapting a network capacity and/or a video quality depending on the result of the determination of the download quality may comprise the step of:

adapting the video quality by adapting a video compression ratio, video pacing, video caching and/or video quality of service settings.

The video compression may, for example, be automatically increased if the download quality is below the defined quality threshold value. Parameters determining the video bitrate needed to present a video at a predefined quality may be adapted by means of the network provider and/or the video data provider. The network provider may, for example, detect by means of the measures described above that the network readiness of a location area at a local time period is insufficient because the download quality is below the predefined quality threshold value. Video download requests originating from the location area at the local time period may be modified by adding video quality control data to the video download request. The video quality may be adapted by means of a video quality control unit of the network provider using video quality control data. The video quality may be alternatively or in addition be adapted by means of the video data provider after receiving video quality control data provided by the network provider.

The video quality control unit may be a single unit comprising a processing device and a corresponding memory device. Alternatively, the video quality control unit may be a distributed arrangement comprising two or more processing devices and memory devices wherein parts of the video quality control unit are located or under control of the network provider and other parts of the video quality control unit are located or under control of the video data provider.

According to a further aspect of the invention a first network system is provided. The first network system comprises a download quality determination unit and a network capacity adaption unit. The download quality determination unit is adapted to determine a download quality for downloading video data. The download quality determination unit is further adapted to determine whether the download quality is above or below a defined quality threshold value. The network capacity adaption unit is adapted to adapt a network capacity depending on the result of the determination of the download quality such that the download quality is above the defined quality threshold value.

The download quality determination unit and the network capacity adaption unit may be single devices comprising one or more processors or processing devices and corresponding memories or memory devices. The download quality determination unit and the network capacity adaption unit may alternatively be a distributed arrangement in the network comprising two or more processing devices and memory devices. The download quality determination unit and the network capacity adaption unit are adapted to perform the corresponding method steps as described in the dependent claims and the corresponding description as described above.

According to a further aspect of the invention a second network system comprising a download quality determination unit and a video quality control unit is provided. The download quality determination unit is adapted to determine a download quality for downloading video data. The download quality determination unit is further adapted to determine whether the download quality is above or below a defined quality threshold value. The video quality control unit is adapted to adapt a video quality depending on the result of the determination of the download quality such that the download quality is above the defined quality threshold value.

The download quality determination unit and the video quality control unit may be single devices comprising one or more processors or processing devices and corresponding memories or memory devices. The download quality determination unit and the video quality control unit may alternatively be a distributed arrangement in the network comprising two or more processing devices and memory devices. The download quality determination unit and the video quality control unit are adapted to perform the corresponding method steps as described in the dependent claims and the corresponding description as described above.

The video quality control unit may further comprise a mobile communication device located at a location area at a local time period. The mobile communication device may be adapted to enable video caching for other mobile communication devices at the location area at the local time period upon reception of video caching control data submitted by the download quality determination unit.

A first mobile communication device may be adapted upon reception of the video caching control data to provide a caching signal, for example, via Bluetooth, WiFi or other suitable technologies to other second mobile communication devices that certain videos are available via the first mobile communication device. The second mobile communication devices may be enabled to initiate automatically or upon confirmation of the corresponding user a handshake with the first communication device such that the second communication devices can receive the videos by means of the first communication device. It may alternatively be possible to perform the handshake as soon as one of the second mobile communication devices is triggered by means of the user to submit a download request with respect to videos for which availability was indicated by means of the caching signal. Bluetooth, WiFi and comparable technologies are locally used in parallel to wide area networks like GSM, UMTS, LTE and the like in order to increase the network capacity and consequently the network readiness for downloading video data. The network readiness and network capacity is thus not restricted to one network system or technology but may comprise two or more interacting network systems or technologies.

According to a further aspect of the invention a communication system may be provided. The communication system may comprise the first network system and/or the second network system according to applicable claims.

It shall be understood that the method, the first network component and the second network component of the applicable claims have if applicable similar and/or identical embodiments, in particular, as defined in the dependent claims.

The invention further relates to a computer program product. The computer program product comprises code means which can be saved on one or more memory devices of a first network system and/or a second network system. And the code means are arranged such that the method according to any applicable claims can be executed by means of one or more processing devices of the first network system and/or the second network system.

It shall be understood that a preferred embodiment of the invention can also be any combination of the dependent claims with the respective independent claim.

Further advantageous embodiments are defined below.

BRIEF DESCRIPTION OF THE DRAWINGS:

These and other aspects of the invention will be apparent from and elucidated with reference to the embodiments described hereinafter.

The invention will now be described, by way of example, based on embodiments with reference to the accompanying drawings.

In the drawings.

In the Figures, like numbers refer to like objects throughout. Objects in the Figures are not necessarily drawn to scale.

DETAILED DESCRIPTION OF EMBODIMENTS:

Various embodiments of the invention will now be described by means of the Figures.

Figure 1:
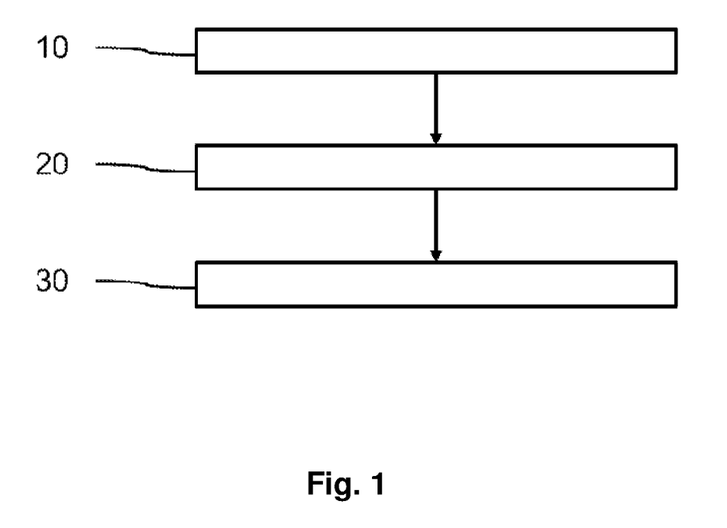
FIG. 1 shows a principal sketch of the method according to a first embodiment

FIG. 1 shows a principal sketch of the method according to a first embodiment. The download quality for downloading video data is determined in step 10. In step 20 it is determined whether the download quality is above or below a defined quality threshold value. The network capacity and/or a video quality are adapted in step 30 in accordance with the result of step 20 such that the download quality is above the defined quality threshold value.

Figure 2:
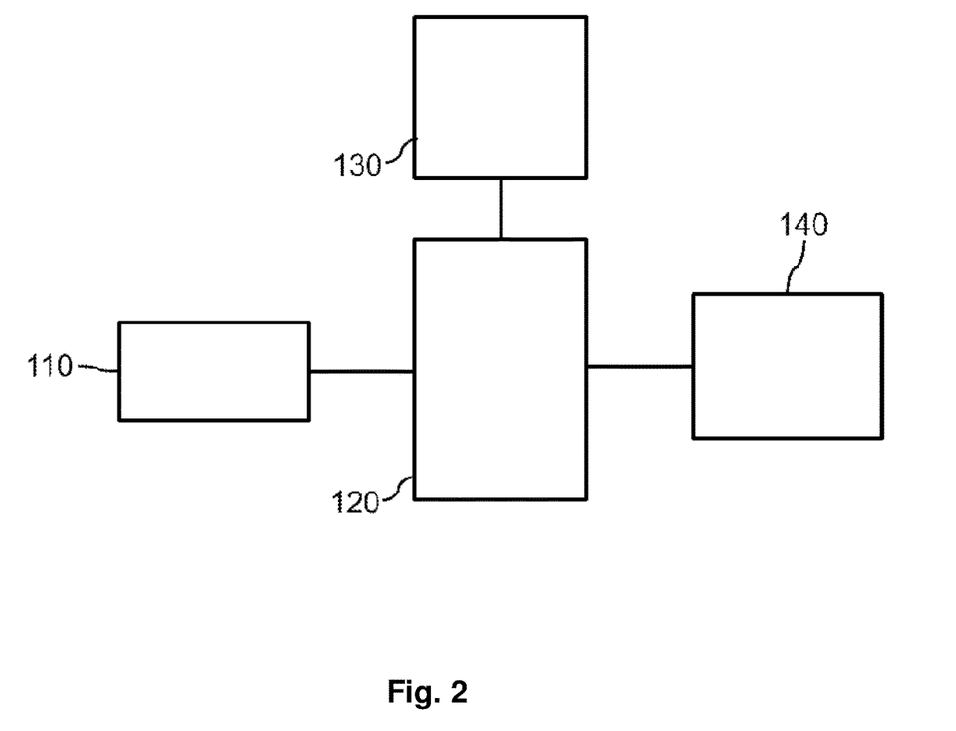
FIG. 2 shows a principal sketch of a communication system with a first network system according to a first embodiment
Figure 3:
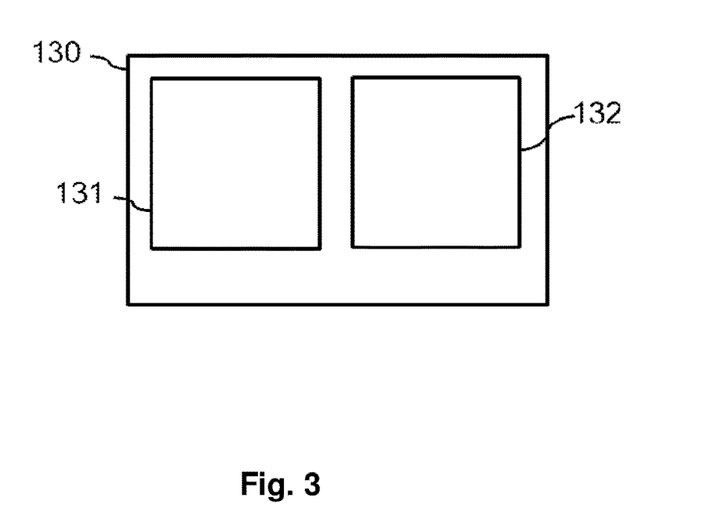
FIG. 3 shows a principal sketch of a first network system

FIG. 2 shows a principal sketch of a communication system with a first network system 130 according to a first embodiment. A more detailed sketch of the first network system 130 is shown in FIG. 3. A communication device 110 is wirelessly or non-wirelessly connected to an infrastructure of a communication network 120. The infrastructure of the communication network 120 enables a connection between the communication device 110 and a video data provider 140. The infrastructure of the communication network 120 is in turn connected to the first network system 130. The first network system 130 comprises a download quality determination unit 131 and a network capacity adaption unit 132 as shown in FIG. 3. The download quality determination unit 131 is adapted to determine a download quality for downloading video data. The download quality determination 131 unit is further adapted to determine whether the download quality is above or below a defined quality threshold value 890. The network capacity adaption unit 132 is adapted to adapt a network capacity depending on the result of the determination of the download quality such that the download quality is above the defined quality threshold value 890.

Figure 4:
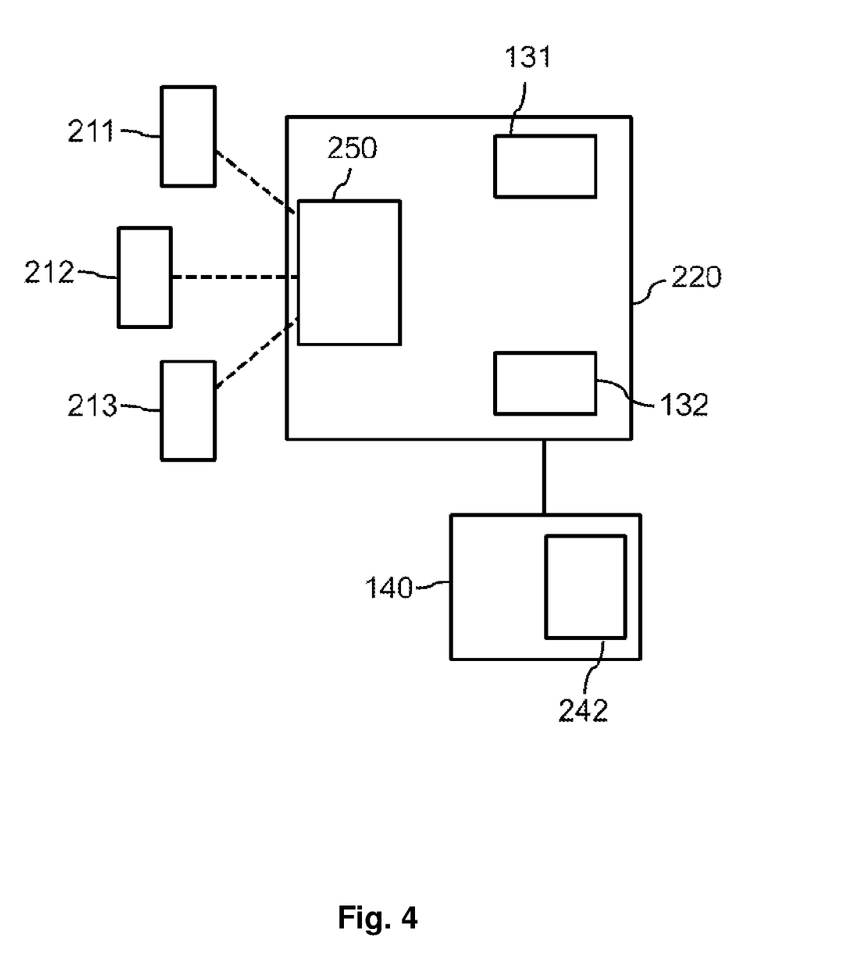
FIG. 4 shows a principal sketch of a communication system with a first network system and a second network system according to a second embodiment

FIG. 4 shows a principal sketch of a communication system with a first network system and a second network system. The first and the second network system are distributed arrangements which are integrated within an infrastructure of a mobile communication network 220 and a video data provider 140. Mobile communication devices 211, 212, 213 are wirelessly connected to base station 250 of the infrastructure of the mobile communication network 220. A download quality determination unit 131 of the infrastructure of the mobile communication network 220 is adapted to determine a download quality for downloading video data by means of the mobile communication devices 211, 212, 213. The download quality determination 131 unit is further adapted to determine whether the download quality is above or below a defined quality threshold value 890. The download quality determination 131 unit is further adapted to generate video quality control data based on the determination whether the download quality is above or below a defined quality threshold value 890. A network capacity adaption unit 132 of the infrastructure of the mobile communication network 220 is adapted to adapt a network capacity depending on the result of the determination of the download quality such that the download quality is above the defined quality threshold value 890. The network capacity adaption unit 132 may, for example activate a further base station (not shown) such that at least a part of the mobile communication devices 211, 212, 213 can be connected to the video data provider 140 by means of the further base station. A video quality control unit 242 located at the video data provider is adapted to receive the video quality control data from the infrastructure of the mobile communication network 220. The video quality control unit 242 is adapted to adapt a video quality depending on the received video quality control data. The video quality control unit adapts, for example, the resolution of requested videos submitted to the infrastructure of the mobile communication network 220 in accordance with the video quality control data. The video quality control unit 242 may alternatively be located at any other point within the mobile communication network.

Figure 5:
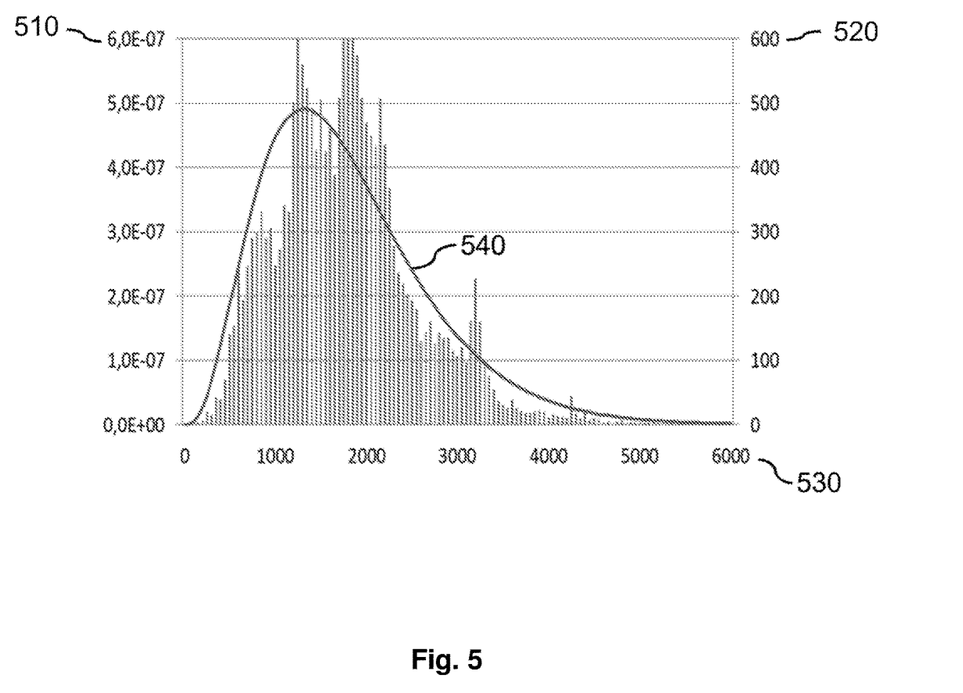
FIG. 5 shows a video bitrate distribution

FIG. 5 shows a video bitrate distribution which was measured by using a resolution of 720p. A frequency of measured video bitrate 520 is shown on the right side and indicated as beam at the corresponding video bitrate 530. The video bitrate distribution can be modelled by means of a second probability distribution function 540 indicating a probability density 510 at the left side at the corresponding video bitrate 530. It could be shown by means of several experiments with different video resolutions that a Gamma Distribution Function can be used to fit the measured video bitrate distribution in order to get the second probability distribution function 540. It is thus possible to assign such a second probability distribution function to each video resolution. The network readiness is always given for lower video resolutions if the network readiness is given for the highest available video resolution. The highest available video resolution within the network may thus be used as video bitrate threshold. Other distribution functions may also be suited for this purpose.

Figure 6:
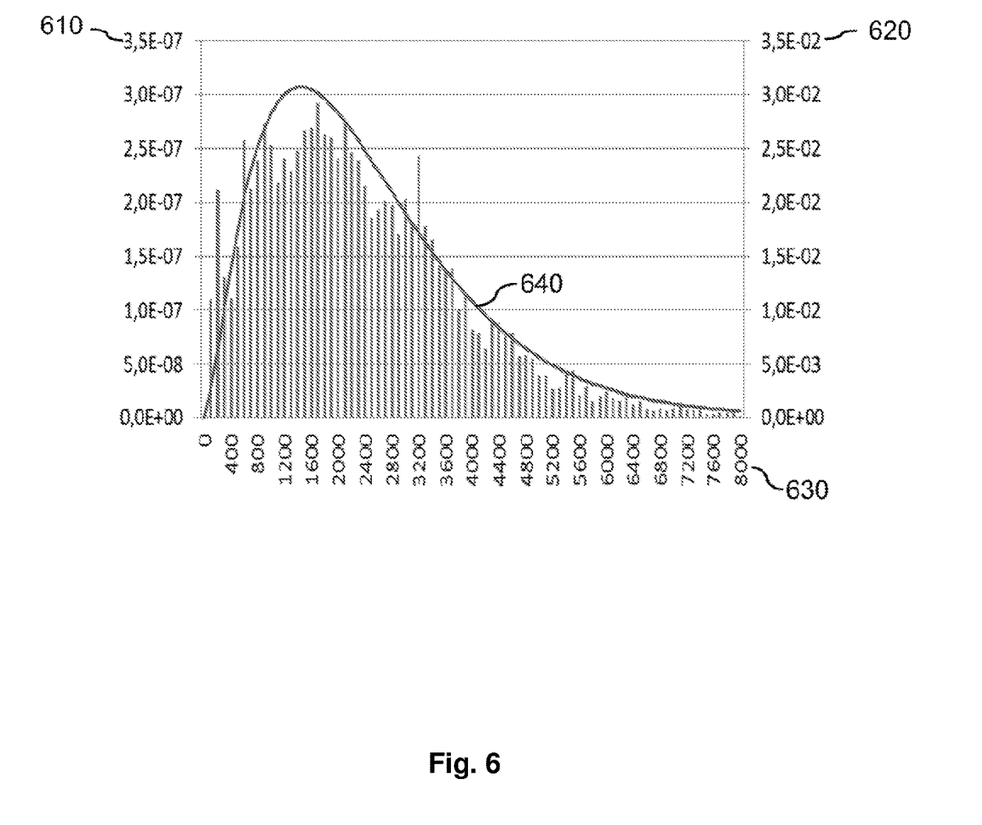
FIG. 6 shows a network download bitrate distribution

FIG. 6 shows a network download bitrate distribution with an average network download bitrate 860 of 2.5 Mbps. A frequency of measured network download bitrate 620 is shown on the right side and indicated as beam at the corresponding network download bitrate 630. The network download bitrate distribution can be modelled by means of a first probability distribution function 640 indicating a probability density 610 at the left side at the corresponding network download bitrate 630. It could be shown by means of several experiments with different average network download bitrates 860 that a Gamma Distribution Function can be used to fit the measured network download bitrate distribution in order to get the first probability distribution function 640. It is thus possible to assign such a first probability distribution function to a measured network download characteristic. The network download bitrate Gamma Distribution function may in a more complex approach be calculated per network bearer, i.e. GSM, EDGE, UMTS, HSDPA, HSPA+ and LTE. LTE, for example, would mean that both the network and the mobile device has to support LTE. If the network supports HSPA+ but the mobile device only supports UMTS, then this video should be counted in the UMTS distribution function. The resulting overall network download rate probability density distribution function is the weighted sum of all these Gamma probability density distribution functions (GDF). For example, if the number of video sessions is as follows:

GSM: A sessions/GDF_GSM
EDGE: B sessions/GDF_EDGE
UMTS: C sessions/GDF_UMTS
HSDPA: D sessions/GDF_HSDPA
HSPA+: E sessions/GDF_HSPA+
LTE: F sessions/GDF_LTE Then the overall Gamma probability density function (GDF_all) is:

GDF_all=A/(A+B+C+D+E+F)*GDF_GSM+B/(A+B+C+D+E+F)*GDF_EDGE+C/(A+B+C+D+E+F)*GDF_UMTS+D/(A+B+C+D+E+F)*GDF_HSDPA+E/(A+B+C+D+E+F)*GDF_HSPA++F/(A+B+C+D+E+F)*GDF_LTE+. Other distribution functions may also be suited for this purpose.

Figure 7:
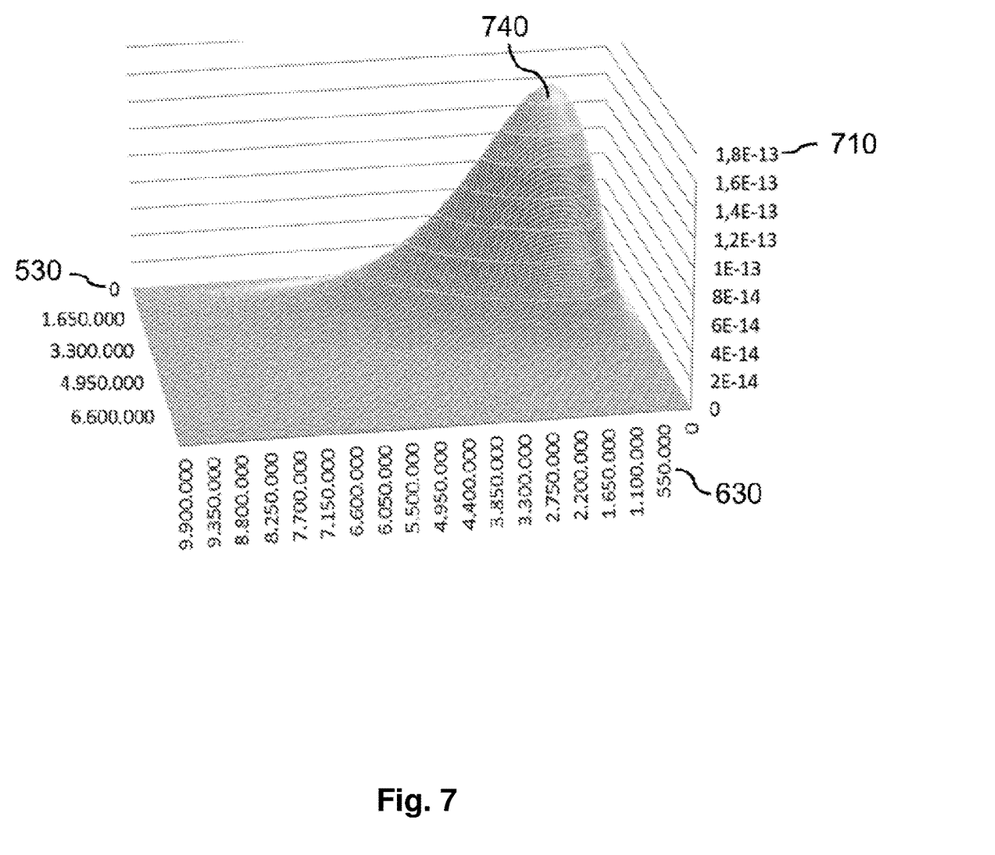
FIG. 7 shows a product function of the distributions shown in FIGS. 5 and 6

FIG. 7 shows a product function of the distributions shown in FIGS. 5 and 6. The first probability distribution function 640 and the second probability distribution function 540 are multiplied resulting in a two-dimensional probability distribution function 740 defining a surface above the level defined by the video bitrate 530 on the left side and the network download bitrate 630 shown at the bottom. The two-dimensional probability distribution function 740 shows the two-dimensional probability density 710 indicated at the right side with respect to the corresponding video bitrate 530 and network download bitrate 630.

Figure 8:
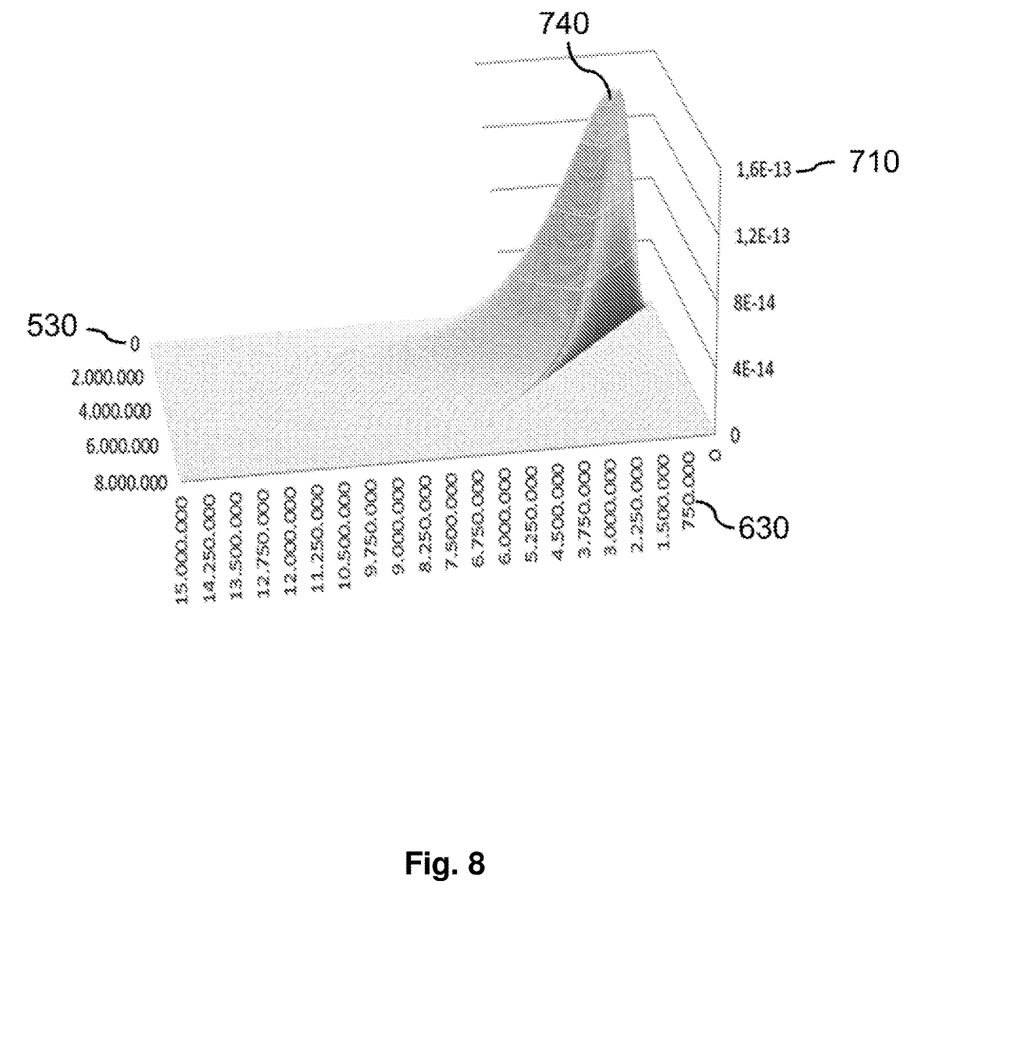
FIG. 8 visualizes the calculation of the network readiness

FIG. 8 visualizes the calculation of the network readiness 850 by means of the two-dimensional probability distribution function 740. The integration of the two-dimensional probability distribution function 740 with respect to the network download bitrate 630 and the video bitrate 530 under the boundary condition that the network download bitrate 630 is higher than the video bitrate 530 is used to calculate the probability that the network download bitrate 630 is higher than the video bitrate 530 for the subset of video downloads with a resolution of 720p. The resulting probability is visualized by the volume under two-dimensional probability distribution function 740 showing only the part fulfilling the condition that the network download bitrate 630 is higher than the video bitrate 530. The calculated probability value of in this case 63% can be taken as measure for the network readiness 850.

Figure 9:
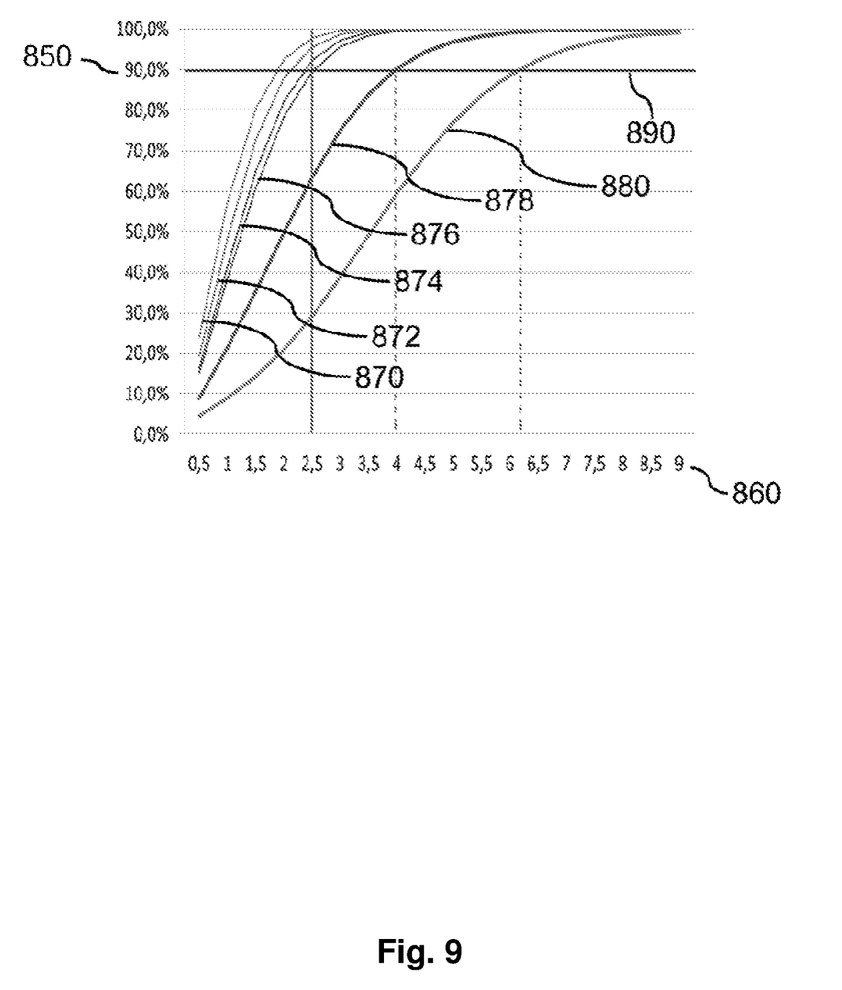
FIG. 9 shows the network readiness with respect to different video resolution

FIG. 9 shows the network readiness 850 for different video resolutions. The network readiness 850 was calculated according to the method shown in FIGS. 5-8 for different video resolutions as a function of average network download bitrate 860 shown at the bottom. Graph 870 shows a network readiness at a video resolution of 144p. Graph 872 shows a network readiness at a video resolution of 240p. Graph 874 shows a network readiness at a video resolution of 360p. Graph 876 shows a network readiness at a video resolution of 480p. Graph 878 shows a network readiness at a video resolution of 720p. Graph 880 shows a network readiness at a video resolution of 1080p. A defined quality threshold value 890 is given at 90% network readiness 850. The higher the video resolution of the videos is the higher has the average network download bitrate 860 to be in order to fulfill the condition that the network readiness 850 has to be above the defined quality threshold value 890. FIG. 9 enables a precise adaption of the average network download bitrate 860 needed by means of determining the probability distribution function of the video bitrate 540 with a relatively low number of samples in view of the approximately known functional dependence (Gamma Distribution Function). The average network download bitrate 860 or the video quality (e.g. video resolution) can be adapted to meet the required quality target (e.g. network readiness >90%).

It's a basic idea of the present invention to provide a method and corresponding devices or systems which enable a control of the network readiness 850 of a communication network with respect to the download of video data. The network readiness 850 may be determined and controlled in real-time or based of past data enabling closed loop or open loop control. Using mathematical models of video bitrate distribution and network download bitrate distribution which are adapted to measured data may be useful to enable a simple calculation of data needed to determine and control the network readiness 850. Knowledge of the principal shape of the distribution functions or probability density functions as, for example, the shape of a Gamma Distribution Function enable determination of the functional parameters with respect to a special download situation by means of minimum of samples of the corresponding measurement parameters.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 step of determining a download quality
20 step of determining whether the download quality is above or below a defined quality threshold value
30 step of adapting a network capacity and/or a video quality
110 communication device
120 infrastructure of communication network
130 first network system
131 download quality determination unit
132 network capacity adaption unit
140 video data provider
211, 212, 213 mobile communication device
220 infrastructure of mobile communication network 242 video quality control unit
250 base station
510, 610, 710 probability density
520 frequency of measured video bitrate
530 video bitrate
540 probability distribution function of video bitrate
620 frequency of measured network download bitrate
630 network download bitrate
640 probability distribution function of network download bitrate
740 two-dimensional probability distribution function
850 network readiness
860 average network download bitrate
870 network readiness at 144p
872 network readiness at 240p
874 network readiness at 360p
876 network readiness at 480p
878 network readiness at 720p
880 network readiness at 1080p
890 defined quality threshold value

The invention claimed is:

1. A method of adapting a network readiness for downloading video data comprising:
determining a download quality for downloading video data wherein the determining the download quality for downloading video data comprises:
determining a network download characteristic for video data; and
determining a video bitrate threshold;
determining whether the download quality is above or below a defined quality threshold value wherein the determining whether the download quality is above or below the defined quality threshold value comprises:
determining a probability whether the download quality is above or below the defined quality threshold value by comparing the network download characteristic and the video bitrate threshold for a download of a subset of video data, wherein the determining the probability whether the download quality is above or below the defined quality threshold value for the download of the subset of video data comprises:
assigning a first probability density distribution function to the network download characteristic;
assigning a second probability density distribution function to the video bitrate threshold;
multiplying the first probability density distribution function with the second probability density distribution function resulting in a two-dimensional probability density distribution function; and
determining a volume under a surface of the two-dimensional probability density distribution function for all network download bitrates which are higher than corresponding video bitrates; and
adapting a network capacity and/or a video quality depending on the result of the determination of the download quality such that the download quality is above the defined quality threshold value.

2. The method according to claim 1, wherein the first probability density distribution function and the second probability density distribution function are gamma distribution functions.

3. The method according to claim 1, wherein the determining the download quality for downloading video data comprises:
determining a local time period and a corresponding location area;
determining an expected video bitrate threshold at the local time period and the corresponding location area; and
determining a probability whether an available network download bitrate is higher than the expected video bitrate threshold for the download of a subset of video data;
wherein the determining whether the download quality is above or below the defined quality threshold value comprises comparing the probability whether the available network download bitrate is higher than the expected video bitrate threshold for the download of a subset of video data with the quality threshold value.

4. The method according to claim 1, wherein the download quality for downloading video data is determined with respect to a local time period and a corresponding location area.

5. The method according to claim 1, wherein the adapting a network capacity and/or a video quality depending on the result of the determination of the download quality comprises adapting the number and/or capacity of base stations serving the location area at the local time period.

6. The method according to claim 1, wherein the adapting a network capacity and/or a video quality depending on the result of the determination of the download quality comprises adapting the video quality by adapting a video compression ratio, video pacing, video caching and/or video quality of service settings.

7. The method according to claim 6, further comprising:
adding video quality control data to a video download request originating from the location area at the local time period; and
adapting the video quality based on the video quality control data.

8. The method according to claim 7, further comprising:
receiving the video quality control data by a video data provider; and
adapting the video quality by means of the video data provider.

9. The method according to claim 7, further comprising:
receiving the video quality control data by a video quality control unit; and
adapting the video quality by means of the video quality control unit.

10. A first network system, comprising:
a download quality determination unit comprising at least one processing device and at least one memory device being arranged to determine a download quality for downloading video data, wherein the at least one processing device and the at least one memory device of the download quality determination unit are arranged to determine a network download characteristic for video data and a video bitrate threshold to determine the download quality, and wherein the at least one processing device and the at least one memory device of the download quality determination unit being further arranged to determine whether the download quality is above or below a defined quality threshold value, wherein the at least one processing device and the at least one memory device of the download quality determination unit are arranged to assign a first probability density distribution function to the network download characteristic and a second probability density distribution function to the video bitrate threshold, wherein the at least one processing device and the at least one memory device of the download quality determination unit are arranged to calculate a two-dimensional probability density distribution function by multiplying the first probability density distribution function with the second probability density distribution function, and wherein the at least one processing device and the at least one memory device of the download quality determination unit are arranged to determine a probability whether the download quality is above or below the defined threshold value by determining a volume under a surface of the two-dimensional probability density distribution function for all network download bitrates which are higher than corresponding video bitrates; and a network capacity adaption unit comprising at least one processing device and at least one memory device being arranged to adapt a network capacity depending on the result of the determination of the download quality such that the download quality is above the defined quality threshold value.

11. A communication system comprising the first network system according to claim 10.

12. A network system, comprising:

a download quality determination unit comprising at least one processing device and at least one memory device being arranged to determine a download quality for downloading video data, wherein the at least one processing device and the at least one memory device of the download quality determination unit are arranged to determine a network download characteristic for video data and a video bitrate threshold to determine the download quality, and wherein the processing device and the memory device of the download quality determination unit being further arranged to determine whether the download quality is above or below a defined quality threshold value, wherein the at least one processing device and the at least one memory device of the download quality determination unit are arranged to assign a first probability density distribution function to the network download characteristic and a second probability density distribution function to the video bitrate threshold, wherein the at least one processing device and the at least one memory device of the download quality determination unit are arranged to calculate a two-dimensional probability density distribution function by multiplying the first probability density distribution function with the second probability density distribution function, and wherein the at least one processing device and the at least one memory device of the download quality determination unit are arranged to determine a probability whether the download quality is above or below the defined threshold value by determining a volume under a surface of the two-dimensional probability density distribution function for all network download bitrates which are higher than corresponding video bitrates, and wherein; and a video quality control unit comprises at least one processing device and at least one memory device being arranged to adapt a video quality depending on the result of the determination of the download quality such that the download quality is above the defined quality threshold value.

13. The network system according to claim 12, wherein the video quality control unit comprises a mobile communication device located at a location area at a local time period, the mobile communication device being arranged to enable video caching for other mobile communication devices at the location area at the local time period upon reception of video caching control data submitted by the download quality determination unit.

* * * * *